US010982970B2

(12) United States Patent
Pippard et al.

(10) Patent No.: US 10,982,970 B2
(45) Date of Patent: Apr. 20, 2021

(54) DISPLAYING SYSTEM AND METHOD FOR DISPLAYING A PERSPECTIVE VIEW OF THE SURROUNDING OF AN AIRCRAFT IN AN AIRCRAFT

(71) Applicant: SAAB AB, Linkoeping (SE)

(72) Inventors: Nigel Pippard, Forserum (SE); Robert Alexander Bennett, Joenkoeping (SE); Jonas Dehlin, Linkoeping (SE); Adam Nilsson, Naessjoe (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/315,209

(22) PCT Filed: Jul. 7, 2016

(86) PCT No.: PCT/SE2016/050701
§ 371 (c)(1),
(2) Date: Jan. 4, 2019

(87) PCT Pub. No.: WO2018/009109
PCT Pub. Date: Jan. 11, 2018

(65) Prior Publication Data
US 2019/0310105 A1 Oct. 10, 2019

(51) Int. Cl.
*G01C 23/00* (2006.01)
*G09B 9/30* (2006.01)
(Continued)

(52) U.S. Cl.
CPC .......... *G01C 23/005* (2013.01); *B64D 43/00* (2013.01); *G01C 23/00* (2013.01); *G06T 15/20* (2013.01);
(Continued)

(58) Field of Classification Search
None
See application file for complete search history.

(56) References Cited

U.S. PATENT DOCUMENTS 5,838,262 A 11/1998 Kershner et al.
7,343,229 B1 * 3/2008 Wilson ................. G08G 5/0021
340/951
(Continued)

FOREIGN PATENT DOCUMENTS

EP       2056273 A1     5/2009
EP       2587222 A1     5/2013
WO    WO 2013/111302 A1  8/2013

OTHER PUBLICATIONS

International Searching Authority (ISA), International Search Report and Written Opinion for International Application No. PCT/SE2016/050701, dated Mar. 30, 2017, 13 pages, Swedish Patent and Registration Office, Sweden.
(Continued)

*Primary Examiner* — Michael J Cobb
(74) *Attorney, Agent, or Firm* — Alston & Bird LLP

(57) ABSTRACT

The present disclosure relates to a method (300) for displaying a perspective view of the surrounding of an aircraft (100) in an aircraft. The method comprises accessing (310) surrounding information from a database. The surrounding information is photo-based and three-dimensional. The method further comprises processing (320) the accessed surrounding information so that a perspective view of the surrounding of the aircraft is provided. The perspective view of the surrounding correlates to the position of the aircraft and is photo-based with spatially correlated photo-based textures. The method further comprises transmitting (360) the provided perspective view of the surrounding of the aircraft to a displaying unit so that it can be displayed in the aircraft. The present disclosure also relates to a system, an aircraft, a use, a computer program, and a computer program product.

21 Claims, 4 Drawing Sheets

(51) Int. Cl.
  *G08G 5/00* (2006.01)
  *B64D 43/00* (2006.01)
  *G06T 15/20* (2011.01)
  *G06T 17/05* (2011.01)

(52) U.S. Cl.
  CPC ........... *G06T 17/05* (2013.01); *G08G 5/0013* (2013.01); *G08G 5/0021* (2013.01); *G08G 5/0086* (2013.01); *G09B 9/30* (2013.01); *G09B 9/301* (2013.01)

(56) References Cited

U.S. PATENT DOCUMENTS

| | | | |
|---|---|---|---|
| 7,675,461 B1 | 3/2010 | Mccusker et al. | |
| 7,925,391 B2* | 4/2011 | Sanders-Reed | G06F 3/14 |
| | | | 345/8 |
| 8,817,067 B1 | 8/2014 | Fan et al. | |
| 9,176,324 B1 | 11/2015 | Scherer et al. | |
| 9,584,791 B1* | 2/2017 | Whalen | H04N 13/122 |
| 2006/0074549 A1 | 4/2006 | Takahashi et al. | |
| 2007/0018887 A1 | 1/2007 | Feyereisen et al. | |
| 2008/0215204 A1* | 9/2008 | Roy | H04B 7/18504 |
| | | | 701/28 |
| 2010/0097241 A1* | 4/2010 | Suddreth | G01C 23/00 |
| | | | 340/972 |
| 2010/0117867 A1* | 5/2010 | He | G01C 23/00 |
| | | | 340/974 |
| 2010/0118116 A1* | 5/2010 | Tomasz | G06T 15/10 |
| | | | 348/36 |
| 2010/0256900 A1 | 10/2010 | Yamaguchi et al. | |
| 2010/0268458 A1* | 10/2010 | Becker | G01C 23/00 |
| | | | 701/532 |
| 2011/0140928 A1 | 6/2011 | Ren et al. | |
| 2011/0254707 A1* | 10/2011 | Landragin | G01C 21/00 |
| | | | 340/979 |
| 2011/0286660 A1 | 11/2011 | Ofek et al. | |
| 2012/0087546 A1* | 4/2012 | Focke | G06T 3/00 |
| | | | 382/104 |
| 2014/0240313 A1* | 8/2014 | Varga | G06T 19/006 |
| | | | 345/419 |
| 2014/0267422 A1* | 9/2014 | Feyereisen | B64D 45/00 |
| | | | 345/634 |
| 2014/0313219 A1 | 10/2014 | Masselle et al. | |
| 2016/0131739 A1* | 5/2016 | Jinkins | G01S 7/12 |
| | | | 342/26 B |
| 2016/0282120 A1* | 9/2016 | Wang | G01C 23/00 |
| 2017/0011338 A1* | 1/2017 | Stenneth | G06Q 50/30 |
| 2017/0084174 A1* | 3/2017 | Suzuki | H04W 4/08 |
| 2017/0132476 A1* | 5/2017 | Chien | G06K 9/00791 |
| 2017/0309060 A1* | 10/2017 | John | G08G 5/0021 |
| 2017/0324943 A1* | 11/2017 | Wu | H04N 5/23238 |
| 2017/0324948 A1* | 11/2017 | Lin | G06T 3/0062 |
| 2017/0345321 A1* | 11/2017 | Cross | G08G 5/0052 |

OTHER PUBLICATIONS

International Preliminary Examining Authority, International Preliminary Report on Patentability for International Application No. PCT/SE2016/050701, including Applicant's response to ISA's Written Opinion dated Mar. 30, 2017, Oct. 9, 2018, 16 pages, Swedish Patent and Registration Office, Sweden.

Extended European Search Report for European Patent Application No. 16908270.8, dated Feb. 3, 2020, (9 pages), European Patent Office, Munich, Germany.

\* cited by examiner

DISPLAYING SYSTEM AND METHOD FOR DISPLAYING A PERSPECTIVE VIEW OF THE SURROUNDING OF AN AIRCRAFT IN AN AIRCRAFT

CROSS REFERENCE TO RELATED APPLICATIONS

This application is a National State Application, filed under 35 U.S.C. § 371, of International Application No. PCT/SE2016/050701, filed Jul. 7, 2016, the contents of which are hereby incorporated by reference in its entirety.

BACKGROUND

Related Field

The present disclosure relates to a displaying system and a method for displaying a perspective view of the surrounding of an aircraft in an aircraft. The present disclosure further relates to the use of a database comprising a photo-based three-dimensional model of at least a part of the Earth's surface with spatially correlated photo-based texture, to an aircraft, a computer program, and a computer program product.

Description of Related Art

Aircrafts of today are often equipped with a so called primary flight display, PFD, showing the most relevant information for flying the aircraft, such as speed, height above ground, heading, and the like. PFD usually are coloured and also show a synthetic view of the surrounding of the aircraft. This synthetic view is usually approximately showing that part of the surrounding which the pilot sees when watching straight ahead outside the cockpit window. The surrounding is, however, very schematic. As an example, the sky is always coloured blue and the ground is always coloured brown or green. In reality, i.e. when looking outside the window, both the sky and the ground could have a large variety of colours. The reason for this discrepancy of the surrounding as represented on the PFD and when looking outside through the window is that pilot should not be motivated to use the PFD for navigation. In other words, the PFD should not be compelling according to regulations from authorities certifying aircrafts or aircraft components.

The data for providing a view of the ground originates mostly from a space shuttle mission, where a height profile of the Earth was produced. This height profile has a limited resolution, around 3 arc-seconds, approximately 90 metres, and the accuracy of a measured height to a given position on Earth is limited as well. This height profile was constructed using radar tomography. Making a compelling representation of the ground based on this data could lead to the fact that large buildings are missing, mountains are shifted, or the like. It could thus be potentially hazardous to use such representations of the ground for navigation, which is the reason for the prohibition of presenting a compelling view of the surrounding on a PFD. These prior art systems are often named synthetic vision systems, SVS. An example of a prior art system is described in U.S. Pat. No. 9,176,324 B1.

BRIEF SUMMARY

It is an objective of the present disclosure to present an improved system and an improved method for displaying a perspective view of the surrounding of an aircraft in an aircraft. It is a further objective of the present disclosure to present an improved aircraft, an improved computer program, an improved computer program product and an improved use.

It is one objective of the present disclosure to improve the method, the system, the aircraft, the computer program, the computer program product and the use in such a way that the method, the system, the aircraft, the computer program, the computer program product and the use are more reliable.

It is one objective of the present disclosure to improve the method, the system, the aircraft, the computer program, the computer program product and the use in such a way that the method, the system, the aircraft, the computer program, the computer program product and the use provide a more realistic use.

It is one objective of the present disclosure to improve the method, the system, the aircraft, the computer program, the computer program product and the use in such a way that the method, the system, the aircraft, the computer program, the computer program product and the use could in principle be used for navigation.

It is one objective of the present disclosure to improve the method, the system, the aircraft, the computer program, the computer program product and the use in such a way that the method, the system, the aircraft, the computer program, the computer program product and the use are more accurate.

It is one objective of the present disclosure to present a more accurate method, system, aircraft, computer program, computer program product and use.

At least one of the objectives is achieved by a method for displaying a perspective view of the surrounding of an aircraft in an aircraft. The method comprises the step of accessing surrounding information from a database. The surrounding information is photo-based and three-dimensional. The method further comprises the step of processing the accessed surrounding information so that a perspective view of the surrounding of the aircraft is provided. The provided perspective view is photo-based with spatially correlated photo-based textures. The perspective view of the surrounding correlates to the position of the aircraft. The method further comprises the step of transmitting said provided perspective view of the surrounding of the aircraft to a displaying unit so that it can be displayed in the aircraft.

This allows presenting a fully realistic view of the surrounding to an operator of the aircraft. Since the surrounding information is photo-based and not, for example, radar based, an operator of the aircraft can directly relate the presented perspective view to a view outside the window. The provided perspective view can thus look as if an operator would look through the window. Thus there will be no longer a difference between the view on the display and the "real" view through the window, allowing the operator to change between the views with minimised adaption time for the eyes/the brain of the operator. Further, in case the view through the window to the ground is covered by clouds, the presented solution allows the operator to know how the ground looks under the clouds. Thus, once the airplane gets under the clouds, the operator will not be taken by surprise about how the view through the window looks like, as the view has already been presented to him on the displaying unit before.

In one example, the method further comprises the step of adding primary flight symbology to the provided perspective view of the surrounding. This has the advantage that all relevant information for navigation and/or operation of the aircraft can be presented to an operator on one screen. This can minimise or even completely take away the need for head movements.

In one example, the method further comprises the step of providing physical quantities of the aircraft from a first sensor arrangement aboard the aircraft. The method further comprises generating the primary flight symbology based on these physical quantities. This allows for high accuracy of the primary flight symbology.

In one example the surrounding information from the database is pre-validated. This results in reliable data and thus reduces the risk for accidents due to relying on wrong data.

In one example the method further comprises the step of validating said provided perspective view of the surrounding in real time. This allows assuring that only validated data is presented to an operator of the aircraft. It provides a way to avoid presenting wrong or outdated data to the operator. Thus it greatly reduces risks for errors and might allow classifying the integrity of the presented data as level A or B in the classification scheme of an aviation authority, such as the FAA.

In one example, the method further comprises the step of providing surrounding information from a second sensor arrangement aboard the aircraft. The validation of the provided perspective view of the surrounding in real time is based on the provided surrounding information from the second sensor arrangement. This is a very advantageous solution for assuring an independent validation of the provided perspective view.

In one example, the method further comprises the step of adapting a degree of validation to the height of the aircraft above ground. This allows a practical solution to the problem of finding a good compromise between safety and practicability.

In one example the database comprises a three-dimensional model of at least a part of the Earth's surface. This provides a good solution for allowing to present a realistic view. It also allows reducing processing time when generating the perspective view.

At least one of the objectives is achieved by the use of a database comprising a photo-based three-dimensional model of at least a part of the Earth's surface with spatially correlated photo-based texture for providing a perspective view of the surrounding of an aircraft to a display unit aboard the aircraft.

At least one of the objectives is achieved by a displaying system for displaying a perspective view of the surrounding of an aircraft in an aircraft. The system comprises a database accessing arrangement. The database accessing arrangement is arranged to access surrounding information from a database. The surrounding information is photo-based and three-dimensional. The system further comprises a processing unit. The processing unit is arranged to receive the accessed surrounding information from the database and to process the accessed surrounding information so that a perspective view of the surrounding of the aircraft is provided. Said perspective view of the surrounding correlates to the position of the aircraft and is photo-based with spatially correlated photo-based textures. The system further comprises a transmitting arrangement. The transmitting arrangement is arranged to transmit the provided perspective view of the surrounding of the aircraft to a displaying unit so that it can be displayed in the aircraft.

In one embodiment, the system further comprises the displaying unit.

In one embodiment the system further comprises a primary flight symbology unit. The primary flight symbology unit is arranged to add primary flight symbology to the provided perspective view of the surrounding.

In one embodiment the system further comprises a first sensor arrangement aboard the aircraft. The first sensor arrangement is arranged to provide physical quantities of the aircraft.

In one embodiment the system further comprises a primary flight symbology unit. The primary flight symbology unit is arranged to receive the physical quantities and to generate primary flight symbology based on the physical quantities.

In one embodiment the surrounding information from the database is pre-validated.

In one embodiment the system further comprises a validation arrangement. The validation arrangement is arranged to validate the provided perspective view of the surrounding in real time.

In one embodiment the system further comprises a second sensor arrangement. The second sensor arrangement is arranged to provide surrounding information of the aircraft.

In one embodiment the validation arrangement is arranged to validate the provided perspective view of the surrounding in real time based on the provided surrounding information from the second sensor arrangement.

In one embodiment the system further comprises an adapting arrangement. The adapting arrangement is arranged to adapt a degree of validation to the height of the aircraft above ground.

In one embodiment the database comprises a three-dimensional model of at least a part of the Earth's surface.

At least one of the objectives is achieved by an aircraft comprising the system according to the present disclosure.

At least one of the objectives is achieved by a computer program for displaying a perspective view of the surrounding of an aircraft in an aircraft. The computer program comprises routines for performing the method according to the present disclosure.

At least one of the objectives is achieved by a computer program product. The computer program product comprises a program code stored on a computer readable storage medium for displaying a perspective view of the surrounding of an aircraft in an aircraft. The storage medium can be non-volatile. The program code is configured to execute the method according to the present disclosure.

The system, the use, the aircraft, the computer program and the computer program product have corresponding advantages as have been described in connection with the corresponding examples of the method according to this disclosure.

Further advantages of the present invention are described in the following detailed description and/or will arise to a person skilled in the art when performing the invention.

BRIEF DESCRIPTION OF THE FIGURES

For a more detailed understanding of the present invention and its objectives and advantages, reference is made to the following detailed description which should be read together with the accompanying drawings. Same reference numbers refer to same components in the different figures. In the following.

DETAILED DESCRIPTION OF VARIOUS EMBODIMENTS

Figure 1:
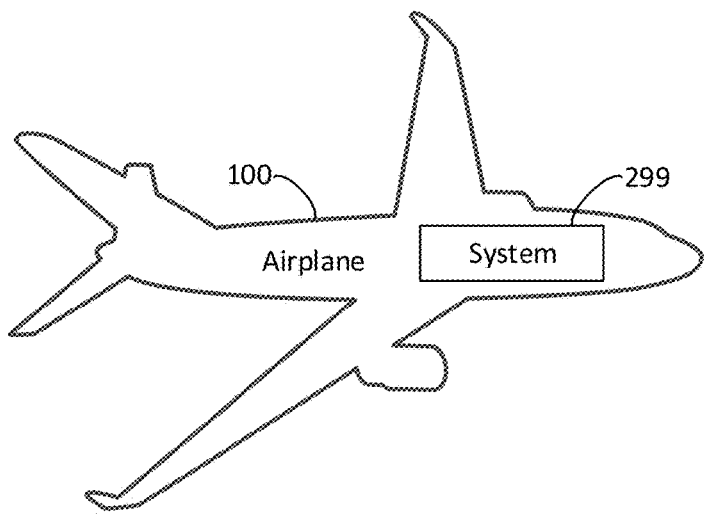
FIG. 1 shows, in a schematic way, an aircraft according to one embodiment of the present invention.

FIG. 1 shows a schematic view of an aircraft 100. The aircraft 100 is preferably a manned aircraft. The shown aircraft 100 is an airplane. However, the aircraft can be any other kind of aircraft such as a helicopter, an airship, or the like. The aircraft 100 comprises a displaying system 299 for displaying a perspective view of the surrounding of an aircraft in an aircraft. This is described in more detail in relation to FIG. 2. The displaying system 299 can be arranged in such a way that the perspective view is presented to an operator of the aircraft, such as a pilot. In one example said aircraft 100 is propeller driven. In one example said aircraft 100 is driven by at least one jet engine.

The term "link" refers herein to a communication link which may be a physical connection such as an optoelectronic communication line, or a non-physical connection such as a wireless connection, e.g. a radio link or microwave link.

Figure 2:
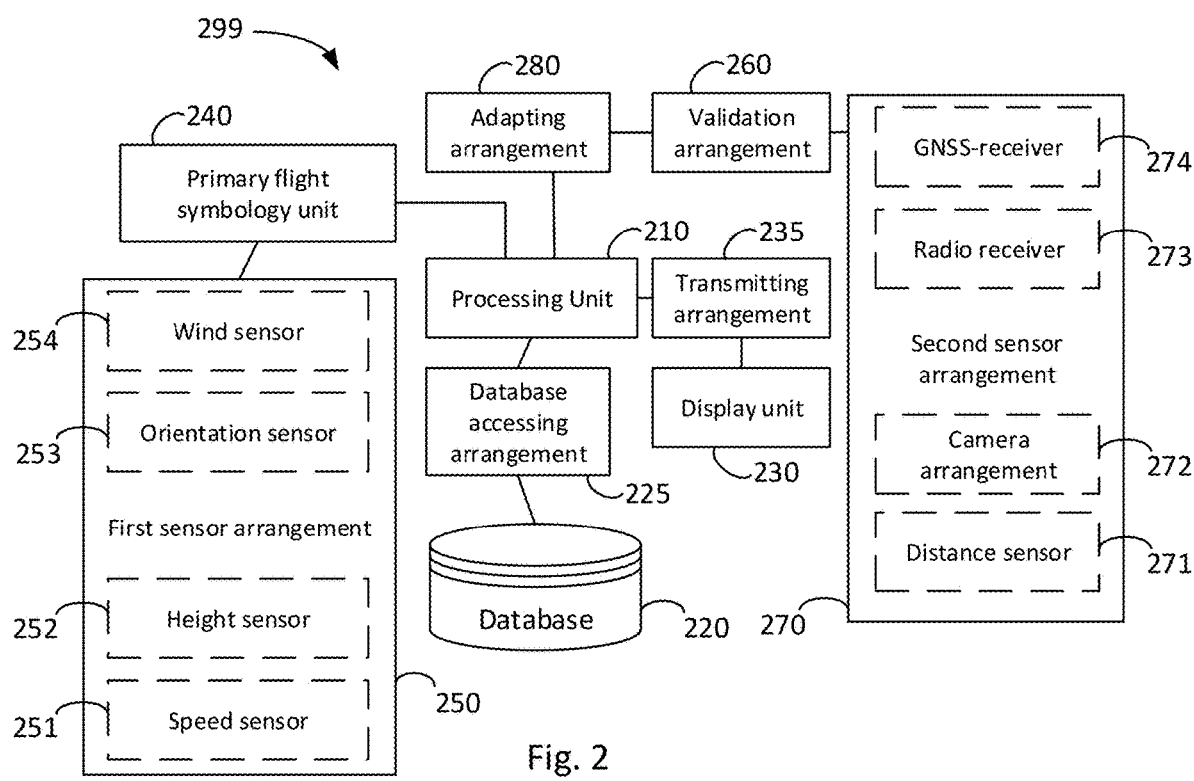
FIG. 2 shows, in a schematic way, a system according to one embodiment of the present invention.

FIG. 2 depicts an embodiment of a displaying system 299 for displaying a perspective view of the surrounding of an aircraft in an aircraft in a schematic way. In one example, said system 299 is arranged for displaying a perspective view of the surrounding of an aircraft in an aircraft in a schematic way. In the following a specific embodiment of the system 299 is described. It should be understood that not all components of this embodiment are necessary for performing the invention and for achieving at least one of the objectives of the present disclosure.

The system 299 can comprise a database 220. Said database 220 can comprise a three-dimensional model of at least a part of the Earth's surface. Said three-dimensional model, 3D-model, can be a "real" 3D-model. Herein the term "real" 3D-model is opposed so as to not refer to models being based on a 2D-representation of the Earth with additional height information, even sometimes called 2.5D-models. As an example, a "real" 3D-model can be based on a mesh representation. An example of a so-called 2.5D-model is a height map. Said 3D-model comprises preferable photo-based texture. Said photo-based texture is preferably spatially correlated. Said photo-based texture can for example originate from satellite images. A company offering such databases and/or data for such databases is Vricon. Since those databases and/or data for those databases are commercially available they are not described here any further.

Said database 220 is in one example based aboard the aircraft. That has the advantage that no communication with elements outside the aircraft is needed for accessing the database. This is especially useful when flying over terrain where it is difficult or impossible to communicate with elements outside the aircraft. Said database 220 can comprise a memory element. Said database can comprise only parts of a 3D-model of the Earth's surface. In one example, said database 220 only comprises relevant parts of the Earth's surface. The term relevant parts relates in one example to parts of the Earth's surface which are and/or can be needed for navigation. Said relevant parts of the Earth's surface can be the parts of the Earth's surface where the aircraft is intended to pass on its route. In one example the term relevant parts relates to parts of the Earth's surface where the aircraft is intended to fly below a certain height. By only storing relevant parts of the Earth's surface aboard the aircraft the required memory space aboard the aircraft can be minimised.

In one example said database 220 is based outside the aircraft. In one example said database is based in another aircraft. In one example said database is ground-based. Basing the database 220 outside the aircraft has the advantage of minimising storage and/or space requirements aboard the aircraft.

In one example, said database 220 comprises pre-validated data. Herein the term pre-validated refers to the fact that the data is validated to its accuracy and/or correctness before it is entered into the database 220. By pre-validating the data inside the database 220 it is avoided that the data comprises objects which are not present in reality and/or that objects present in reality are not comprised in the data. Such types of objects are for example buildings, infrastructure, mountains, or the like. By pre-validation the data inside the database 220 it can be assured that the position of objects comprised in the data inside the database does not deviate from the real position more than a pre-determined threshold, such as 10 meters, 5 meters, 3 meters, 2 meters, 1 meters, half a meter, or the like. Said pre-determined threshold can be different for different objects. As an example, the position of a runway has in one example a lower threshold than the position of the mountain.

In one example, said system 299 comprises a processing unit 210 and a database accessing element 225. Said database accessing element 225 is arranged to access surrounding information from a database. Said database accessing element 225 can be a communication element such as a communication element for providing wireless communication. Said database accessing element 225 can comprise a radio communication element. Said database accessing element 225 can be a communication element for providing optical and/or electrical communication to the database 220. In one example, said database accessing element 225 is comprised in the processing unit 210. In one example, said database accessing element 225 is comprised in another communication element of the aircraft. Such other communication elements are for example communication elements which are arranged for ground communication. Communication elements aboard the aircraft for ground communication are well known in the art and thus not described here any further.

Said processing unit 210 is arranged to receive said accessed surrounding information from the database 220. Said processing unit 210 is arranged to process said accessed surrounding information so that a perspective view of the surrounding of the aircraft is provided, wherein said perspective view of the surrounding correlates to the position of the aircraft. Said processing unit 210 can comprise a so-called rendering engine. In one example, said perspective view of the surrounding correlates to the position of the aircraft in such a way that the view is a view which an operator of the aircraft would see in case the operator would look outside the window of the aircraft. Said provided perspective view from the processing unit 210 is photo-based with spatially correlated photo-based textures. This is preferably achieved by processing the spatially correlated photo-based textures from the database 220. By this, the processing unit can provide a photo-realistic perspective view of the surrounding of the aircraft. Said photo-realistic perspective view of the surrounding can thus provide a real life experience for the operator of the aircraft.

Said system can comprise a transmitting arrangement 235 and/or a displaying unit 230. Said transmitting arrangement 235 is arranged to transmit said provided perspective view of the surrounding of the aircraft to the displaying unit 230 so that it can be displayed in the aircraft. Said transmitting arrangement 235 can comprise optical components such as lenses, mirrors, filters, and/or optical fibres. Said transmitting arrangement 235 can comprise electrical cables. Said transmitting arrangement 235 can comprise a sending arrangement, being arranged to transmit wireless signals and/or signals over physical links. Said transmitting arrangement 235 can be fully or partially comprised in the processing unit 210.

Said displaying unit 230 can comprise any kind of display, such as a liquid crystal display, LCD, a display based on light emitting diodes, LED-display, cathode ray tube CRT display, or the like. Said displaying unit 230 can be a primary flight display. Said displaying unit 230 can be part of a head-up display, HUD. Said displaying unit 230 can be part of a head-down display, HDD.

Said system 299 can comprise a first sensor arrangement 250. Said first sensor arrangement 250 is preferably aboard the aircraft. Said first sensor arrangement 250 is arranged to provide physical quantities of the aircraft. In one example, said first sensor arrangement 250 comprises a speed sensor 251. Said speed sensor 251 is arranged to determine the speed of the aircraft. In one example said speed relates to a speed over ground. In one example said speed relates to a speed in relation to the surrounding air. In one example said first sensor arrangement 250 comprises a height sensor 252. Said height sensor 252 is arranged to determine the height of the aircraft. Said height can relate to the height of the aircraft above ground. Said height can relate to the height of the aircraft above sea level. In one example said first sensor arrangement 250 comprises an orientation sensor 253. Said orientation sensor 253 is arranged to determine an orientation of the aircraft. Said determination can comprise the orientation in one, two, or three dimension. As an example, said orientation sensor 253 can be arranged to determine the roll angle, the yaw angle, and/or the pitch angle of the aircraft. In one example said first sensor arrangement 250 comprises a wind sensor 254. Said wind sensor 254 can be arranged to determine the speed and/or direction of the wind acting on the aircraft. Said first sensor arrangement can comprise sensor(s) being arranged to determine the altitude, the attitude, the vertical speed, the slip/skid, the outside temperature and/or any other physical quantity.

Said system 299 can comprise a primary flight symbology unit 240. Said primary flight symbology unit 240 can be arranged to add primary flight symbology to said provided perspective view of the surrounding. Said primary flight symbology unit 240 can be arranged to receive said physical quantities from said first sensor arrangement 250. Said primary flight symbology unit 240 can be arranged to generate primary flight symbology based on said physical quantities. The symbology which is used on primary flight displays is well known in the art and thus not described any further here.

In one example, said primary flight symbology unit 240 is part of the processing unit 210.

Said system 299 can comprise a second sensor arrangement 270. Said second sensor arrangement 270 is arranged to provide surrounding information of the aircraft. Said second sensor arrangement 270 is preferably aboard the aircraft. Data from said second sensor arrangement 270 can be used for validating said provided perspective view of the surrounding in real time.

Said second sensor arrangement 270 can comprise a distance sensor 271. Said distance sensor 271 can be any sensor being arranged to determine the distance between the aircraft and the ground. Said distance sensor 271 can be arranged to determine a height profile of a ground area in the surrounding of the aircraft. Said distance sensor 271 can comprise a LIDAR-arrangement. Said distance sensor 271 can work on the so-called time-of-flight principle. Said distance sensor 271 can be arranged to detect light. The light can be in the visible range and/or in the infrared range.

Said second sensor arrangement 270 can comprise a camera arrangement 272. Said camera arrangement 272 can be arranged to provide images of the surrounding of the aircraft. Said images of the surrounding are in one example images showing at least partly the ground of surrounding of the aircraft.

Said second sensor arrangement 270 can comprise a radio receiver 273. Said radio receiver can be arranged to receive radio signals from an instrument landing system. Said radio receiver can be arranged to receive radio signals from a positioning and/or guidance system.

Said second sensor arrangement 270 can comprise a receiver 274 for a Global Navigation Satellite System, GNSS. Said GNSS-receiver 274 is arranged for receiving signals from a GNSS like GPS, GALILEO, GLONASS, or the like.

Said system 299 can comprise a validation arrangement 260. Said validation arrangement is arranged to validate said provided perspective view of the surrounding in real time. Herein the term real time relates to the fact that the validation is performed during operation of the aircraft during a pre-determined time period. Said pre-determined time period can be five, three, two, or one second(s). Said time period can be adapted according to the circumstances. As an example, during high altitude flights said time period might be longer than during flights close to the ground. By validating the provided perspective view in real time it can be assured that no wrong information is displayed to the pilot. Said transmitting means 235 can be arranged to not transmit said perspective view in case it is determined that it cannot be validated. Said display unit 230 can be arranged to not display the perspective view in case it is determined that it cannot be validated. Said processing unit 210 can be arranged to not provide a perspective view in case it cannot be validated.

Said validation arrangement 260 can be arranged to validate said provided perspective view of the surrounding in real time based on said provided surrounding information from said second sensor arrangement 270. In one example, the validation arrangement compares a height profile of the surrounding and/or a distance to the ground with said provided perspective view. In case it is determined that a deviation between the height profile and/or a distance to ground and the corresponding height profile and/or distance to the ground from the provided perspective view deviates more than a pre-determined threshold it can be concluded that the perspective view cannot be validated. In case it is determined that a deviation between the height profile and/or a distance to ground and the corresponding height profile and/or distance to the ground from the provided perspective view does not deviate more than a pre-determined threshold it can be concluded that the perspective view can be validated. Said height profile and/or distance to ground might be provided by said distance sensor 271.

In one example, the validation arrangement 260 compares a sensor image of the surrounding with said provided perspective view. In case it is determined that a deviation between the sensor image of the surrounding and the corresponding provided perspective view deviates more than a pre-determined threshold it can be concluded that the perspective view cannot be validated. In case it is determined that a deviation between the sensor image of the surrounding and the corresponding provided perspective view does not deviate more than a pre-determined threshold it can be concluded that the perspective view can be validated. Said sensor image may be a camera image or a radar image. Said camera image of the surrounding might be provided by said camera arrangement 272.

In one example, the validation arrangement compares a signal from an instrument landing system with said provided perspective view. In case it is determined that a deviation between the signal from an instrument landing system and the corresponding provided perspective view deviates more than a pre-determined threshold it can be concluded that the perspective view cannot be validated. In case it is determined that a deviation between the signal from an instrument landing system and the corresponding provided perspective view does not deviate more than a pre-determined threshold it can be concluded that the perspective view can be validated. As an example, the deviation between the signal from an instrument landing system and the perspective view can relate to difference in position of a runway as provided by the instrument landing system compared to the position of the runway as provided by the provided perspective view. Said signal from an instrument landing system might be provided by said radio receiver 273.

In one example, the validation arrangement compares a position of the aircraft as being provided through a GNSS with said provided perspective view. In case it is determined that a deviation between the position of the aircraft as being provided through a GNSS and the corresponding provided perspective view deviates more than a pre-determined threshold it can be concluded that the perspective view cannot be validated. In case it is determined that a deviation between the position of the aircraft as being provided through a GNSS and the corresponding provided perspective view does not deviate more than a pre-determined threshold it can be concluded that the perspective view can be validated. Said position of the aircraft as being provided through a GNSS might be provided by said GNSS-receiver 274. In case the validation is performed based on a received signal from the GNSS-receiver 274 it is advantageous if this signal has not been used for providing the perspective view. As an example, said perspective view can be provided based on the signal of an inertial measurement unit, IMU.

In one example, said validation arrangement 260 is part of the processing unit 210.

Said system 299 can comprise an adapting arrangement 280. The adapting arrangement 280 can be arranged to adapt a degree of validation to the height of the aircraft. Said height of the aircraft can relate to a height above ground and/or a height above sea-level. As an example, a first height threshold is provided. Above said first height threshold, no validation is performed. Below said first height threshold a validation is performed. In one example said first threshold is 3,000 metres, 5,000 metres, 8,000 metres, or 10,000 metres. Depending on the area of operation of the aircraft, said first threshold might assure that the aircraft cannot crash into any obstacles such as mountains. Since no ground contact can be achieved above said first threshold, one might dispense with a validation.

In one example a second height-threshold is provided. Above said second height-threshold a first kind of validation is performed and below said second height-threshold a second kind of validation is performed. Said second kind of validation is different from said first kind of validation. In one example, above said second threshold a validation based on a GNSS is performed. In one example, below said second threshold a validation based on a distance and/or a height profile as has been described earlier is performed. This allows a more precise validation in case the aircraft comes closer to the ground. This assures a better validation in case the aircraft flies in a demanding terrain where, for example, a wrong view might potentially risk a collision of the aircraft with obstacles such as mountains, hills, or buildings.

In one example, below said second threshold a validation based on signals from an instrument landing system as has been described earlier is performed. This assures especially when approaching a runway that the perspective view is highly accurate.

The above described principle can be adapted to any number of height thresholds. A corresponding principle can also be applied to a position of the aircraft. In one example, when flying over water areas such as oceans a lower degree of validation might be needed as compared when flying over land areas or when approaching the cost line.

In one example, said adapting arrangement 280 is part of the processing unit 210.

FIG. 2 depicts an example of how the aforementioned components can be connected to each other. Other solutions are, however, possible. As an example, said primary flight symbology unit 240 could be directly signal connected to the displaying unit 230 or the transmitting arrangement 235. This can assure providing primary flight symbology even in case the processing unit 210 malfunctions. As an example, said validation arrangement 260 and/or said adapting arrangement 280 can be directly signal connected to the transmitting arrangement 235 or the displaying unit 230, or be placed in between the processing unit 210 and the displaying unit 230. In that case a perspective view might always be provided, but the validation unit 260 might, for example, be arranged to prevent transmission of the provided view to the displaying unit 230.

Figure 3:
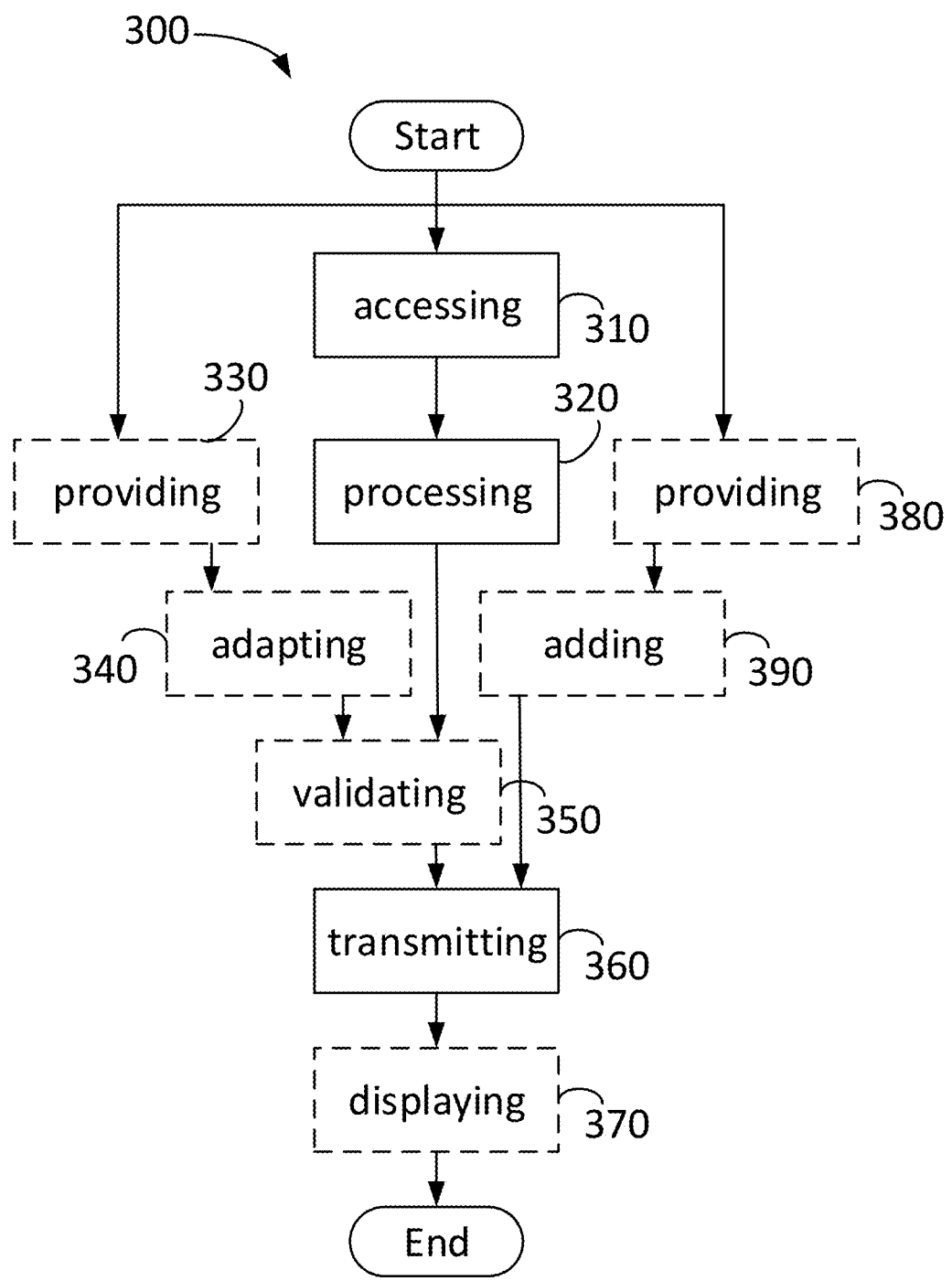
FIG. 3 shows, in a schematic way, a flow chart over an example of a method according to the present invention.

In FIG. 3 a schematic flow chart over an example of a method 300 according to the present invention is depicted. The method 300 relates to a method for displaying a perspective view of the surrounding of an aircraft in an aircraft. Optional steps are depicted with dashed lines. It should be emphasised that the flowchart depicts only one example of how a method according to the present disclosure can be performed. Different orders of the steps are possible. Especially step 350 is in one example performed after step 360 or before step 320. The same applies for step 390 in relation to step 360 and step 320. The method 300 is preferably repeated. The method 300 starts with step 310.

In step 310 surrounding information is accessed from a database. Said surrounding information is preferably photo-based and three-dimensional. Said surrounding information can be pre-validated. This has been described in relation to FIG. 2. Said database can comprise a three-dimensional model of at least a part of the Earth's surface. Said accessing can comprise communicating with a database unit. Said database unit can be aboard the aircraft or outside the aircraft. Said accessing can comprise sending positioning information of the aircraft to the database. Said accessing can comprise sending information regarding the heading and/or the orientation of the aircraft to the database. Said accessing can comprise transmitting said surrounding information from the database to a processing unit. Step 310 can be performed by the database accessing arrangement 225. The method continues with step 320 after step 310.

In step 320 said accessed surrounding information is processed so that a perspective view of the surrounding of the aircraft is provided, wherein said perspective view of the surrounding correlates to the position of the aircraft. Said provided perspective view is photo-based with spatially correlated photo-based textures. Said spatially correlated photo-based textures is preferably based on the surrounding information which is accessed from the database in step 310. Step 320 can be performed by said processing unit 210. The method continues with step 350 or step 360 after step 320.

The method 300 can comprise a step 380 of providing physical quantities of the aircraft from a first sensor arrangement aboard the aircraft. Said physical quantities can comprise any of the altitude, the attitude, the vertical speed, the slip/skid, the outside temperature, the wind speed, the height, the total speed, or any other physical quantity of the aircraft. Said height can relate to a height above ground and/or a height above sea-level. Said speed can relate to a speed relative to the ground and/or relative to the surrounding air. Step 380 can comprise generating a primary flight symbology based on said physical quantities. The method continues with step 390.

In step 390 primary flight symbology is added to said provided perspective view of the surrounding. The method continues with step 320, step 360, or step 370.

The method 300 can comprise the step 330. In step 330 surrounding information from a second sensor arrangement aboard the aircraft is provided. Said surrounding information can comprise any of at least one picture of the surrounding of the aircraft, a position of the aircraft, data from an instrument landing system, a height profile of the surrounding, at least one distance between the aircraft and the ground, or the like. The method continues with step 340 after step 330.

In step 340 a degree of validation is adapted to the height of the aircraft above ground. This has been described in more detail in relation to FIG. 2. Preferably said adaption is performed in such a way that a more accurate validation is performed and/or required the closer the aircraft is to the ground, and/or the closer the aircraft is to pre-determined geographical positions or zones. Said pre-determined geographical positions or zones could be a cost-line, a country, a region, for example a political or a geographical region, an airport, or the like. The method continues with step 350 after step 340.

In step 350 said provided perspective view of the surrounding is validated in real time. The term real time has been described in relation to FIG. 2. Step 350 can comprise basing said validation of the provided perspective view of the surrounding on said provided surrounding information from said second sensor arrangement. Said validation can comprise determining a difference between at least parts of said provided surrounding information from said second sensor arrangement and at least parts of said provided view of the surrounding. In one example said difference is a single value. In one example said difference is a difference map or any other difference comprising more than one value. Determining said difference can comprise determining an absolute value of a difference between at least parts of said provided surrounding information from said second sensor arrangement and at least parts of said provided view of the surrounding. Determining said difference can comprise determining a maximum and/or a minimum value of a difference between at least parts of said provided surrounding information from said second sensor arrangement and at least parts of said provided view of the surrounding. Determining said difference can comprise determining an average value of a difference between at least parts of said provided surrounding information from said second sensor arrangement and at least parts of said provided view of the surrounding. Said validation can comprise determining whether said difference is lower than a pre-determined threshold. In one example said perspective view is considered to be validated in case said difference is above/below said pre-determined threshold. In one example said perspective view is considered not validated in case said difference is below/above said pre-determined threshold. The method continues with step 360 or step 370 after step 350.

In step 360 said provided perspective view of the surrounding of the aircraft is transmitted to a displaying unit so that it can be displayed in the aircraft. In one example said perspective view is only transmitted in case it has been successfully validated in step 360. In one example step 360 comprises transmitting primary flight symbology. In one example step 360 comprises transmitting primary flight symbology irrespective of whether said perspective view is transmitted or not. The method continues with step 370.

In step 370 the perspective view of the surrounding of the aircraft is displayed in the aircraft. Step 370 can comprise only displaying said perspective view in case it has been successfully validated. Step 370 can comprise displaying information whether said perspective view has been successfully validated. Step 370 can comprise displaying said primary flight symbology.

This is in one example performed irrespective of whether the perspective view is displayed or not. Said displaying can be performed on a PFD. Said displaying can be performed on a HDD. Said displaying can be performed on a HUD. After step 370 the method 300 ends.

In one example step 330, and step 340 are performed in parallel to step 310 and step 320. In one example step 380, and step 390 are performed in parallel to step 310 and step 320. It should be understood that the order of the steps can be exchanged or that steps can be performed in parallel. The only restriction regarding the order of the steps arises in case one step needs the result of another step as input.

Figure 4A:
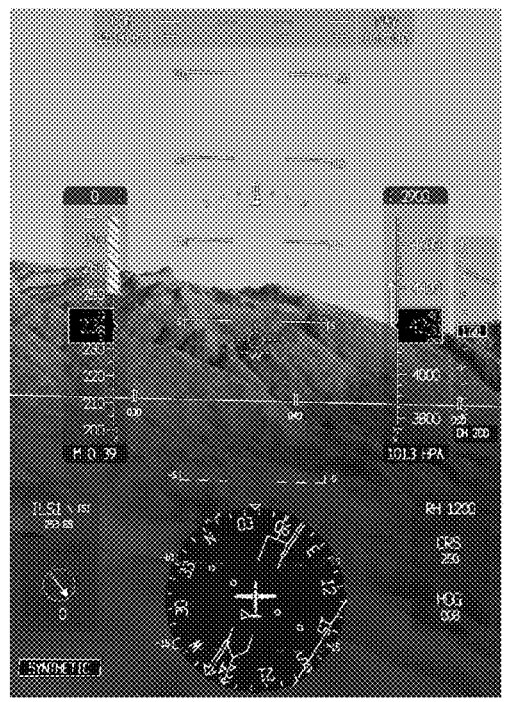
FIG. 4a depicts a schematic example view on a display unit according to a prior art solution.

FIG. 4*a* depicts a schematic example view on a display unit according to a prior art solution. As can be seen, the ground is only schematically depicted.

Figure 4B:
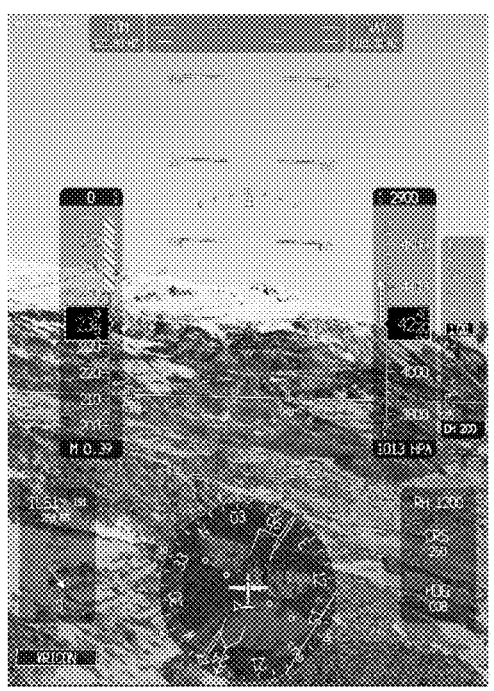
FIG. 4b depicts a schematic example view on a display unit, where a database is used according to the present disclosure.

FIG. 4*b* depicts a schematic example view on a display unit, where a database is used according to the present disclosure. In the shown example a view on a PFD as it can be installed in an aircraft is depicted. Said view is a perspective view of the surrounding of an aircraft. Said view is generated based on a database comprising a photo-based three-dimensional model of at least a part of the Earth's surface with spatially correlated photo-based texture. In one example said view is a realistic view of the surrounding of the aircraft.

The present disclosure relates also to a computer program for displaying a perspective view of the surrounding of an aircraft in an aircraft. Said computer program comprises performing at least parts of the method 300 as described in relation to FIG. 3. Said computer program can at least partly be run on said processing unit. Said computer program can comprise routines for accessing the database so that surrounding information is achieved from the database. Said computer program can comprise routines for processing said accessed surrounding information so that a perspective view of the surrounding of the aircraft is provided, wherein said perspective view of the surrounding correlates to the position of the aircraft. Said computer program can further comprise routines for transmitting said provided perspective view of the surrounding of the aircraft to a displaying unit so that it can be displayed in the aircraft. Said computer program can further comprise routines for controlling said second sensor arrangement and/or said first sensor arrangement. Said computer program can further comprise routines for analysing and processing information received from said second sensor arrangement and/or said first sensor arrangement. Said computer program can comprise routines for controlling any of the elements 210-280 described in relation to FIG. 2.

Figure 5:
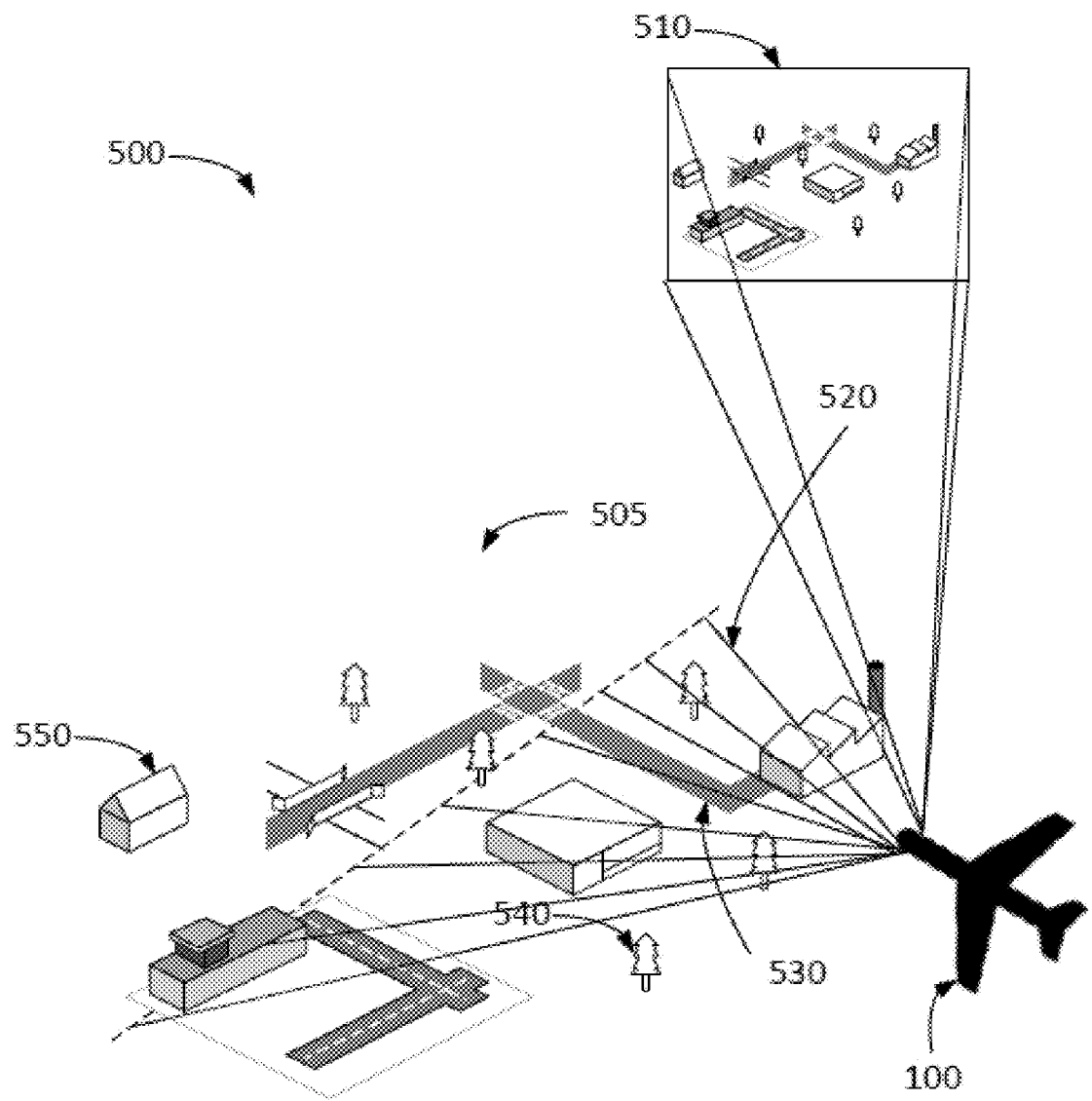
FIG. 5 depicts a schematic scene in which the present disclosure can be used.

FIG. 5 depicts a schematic scene 500 in which the present disclosure can be used. FIG. 5 is not to scale. Said scene 500 comprises a scene 505 on the ground. Said scene 505 on the ground can comprise buildings 550, infrastructure 530, vegetation 540, and surface elevations, for example due to hills, valleys, mountains, or the like. An airplane 100 is flying over the scene 505 on the ground. A perspective view 510 of the surrounding of the aircraft is displayed inside the aircraft. Said perspective view 510 can be displayed on a PFD, wherein the primary flight symbology is omitted in FIG. 5 to not overload the figure. The aircraft 100 comprises a sensor arrangement which is arranged to scan the ground 520 and provide a height profile of the ground based on that scanning. This height profile can then be compared to the perspective view 510 to validate the perspective view in real time. FIG. 5 shows only a very specific situation in a schematic way. It should be understood that this situation can vary and that anything described before in relation to the system 299, the method 300 and the computer program can be used in the situation as well.

The foregoing description of the preferred embodiments of the present invention is provided for illustrative and descriptive purposes. It is neither intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

It should especially be noted that the system according to the present disclosure can be arranged to perform any of the steps or actions described in relation to the method 300. It should also be understood that the method according to the present disclosure can further comprise any of the actions attributed to an element of the displaying system 299 described in relation to FIG. 2. The same applies to the use, to the computer program and the computer program product.

The invention claimed is:

1. A method (300) for displaying a perspective view of the surrounding of an aircraft (100) in an aircraft, the method comprising the steps:
   accessing (310) surrounding information from a database by sending position information of the aircraft to the database, the surrounding information including multiple photos;
   processing (320) said multiple photos within said accessed surrounding information to generate and provide a photo-based perspective view of the surrounding of the aircraft, wherein said perspective view of the surrounding correlates to the position information of the aircraft; and
   transmitting (360) said provided perspective view of the surrounding of the aircraft to a displaying unit so that it can be displayed in the aircraft,
   wherein:
      said surrounding information is photo-based and three-dimensional,
      said surrounding information consists of said multiple photos, which are spatially correlated, and
      photo-based textures of the provided perspective view are spatially correlated.

2. The method according to claim 1, further comprising the step of adding (390) primary flight symbology to said provided perspective view of the surrounding.

3. The method according to claim 2, further comprising the steps of:
   providing (380) physical quantities of the aircraft from a first sensor arrangement aboard the aircraft, and
   generating said primary flight symbology based on said physical quantities.

4. The method according to claim 1, wherein said surrounding information from the database is pre-validated.

5. The method according to claim 1, further comprising the step of validating (350) said provided perspective view in real time.

6. The method according to claim 5, further comprising the step of providing (330) information from a second sensor arrangement aboard the aircraft, and wherein said validation (350) of the provided perspective view in real time is based, in part, on said provided information from said second sensor arrangement.

7. The method according to claim 1, wherein said database comprises a three-dimensional model of at least a part of the Earth's surface.

8. A computer program for displaying a perspective view of the surrounding of an aircraft in an aircraft, wherein the computer program is stored on a non-transitory computer readable storage medium and comprises routines for performing the method according to claim 1.

9. A computer program product, comprising a program code stored on a non-transitory computer readable storage medium for displaying a perspective view of the surrounding of an aircraft in an aircraft, the program code being configured to execute the method according to claim 1.

10. A displaying system (299) for displaying a perspective view of the surrounding of an aircraft (100) in an aircraft, the system comprising:
   a database accessing arrangement (225) configured to access surrounding information from a database (220) by sending position information of the aircraft to the database, the surrounding information including multiple photos;
   a processing unit (210) configured to receive said accessed surrounding information from the database and to process said multiple photos within said accessed surrounding information to generate and provide a photo-based perspective view of the surrounding of the aircraft, wherein said perspective view of the surrounding correlates to the position information of the aircraft; and
   a transmitting arrangement (235) configured to transmit said provided perspective view of the surrounding of the aircraft to a displaying unit so that it can be displayed in the aircraft;

wherein:
said surrounding information is photo-based and three-dimensional,
said surrounding information consists of said multiple photos, which are spatially correlated, and
photo-based textures of the provided perspective view are spatially correlated.

11. The system according to claim 10, further comprising said displaying unit (230).

12. The system according to claim 10, further comprising a primary flight symbology unit (240) configured to add primary flight symbology to said provided perspective view of the surrounding.

13. The system according to claim 11, further comprising a first sensor arrangement (250) aboard the aircraft configured to provide physical quantities of the aircraft.

14. The system according to claim 13, further comprising a primary flight symbology unit (240) configured to receive said physical quantities and to generate primary flight symbology based on said physical quantities.

15. The system according to claim 10, wherein said surrounding information from the database is pre-validated.

16. The system according to claim 10, further comprising a validation arrangement (260) configured to validate said provided perspective view of the surrounding in real time.

17. The system according to claim 10, further comprising a second sensor arrangement (270), wherein said second sensor arrangement is configured to provide surrounding information of the aircraft.

18. The system according to claim 17, wherein said validation arrangement (260) is configured to validate said provided perspective view of the surrounding in real time based on said provided surrounding information from said second sensor arrangement (270).

19. The system according to claim 17, further comprising an adapting arrangement (280), the adapting arrangement being configured to adapt a degree of validation to the height of the aircraft above ground.

20. The system according to claim 10, wherein said database (220) comprises a three-dimensional model of at least a part of the Earth's surface.

21. An aircraft (100) comprising the system according to claim 10.

* * * * *